United States Patent
Liang et al.

(10) Patent No.: US 11,817,552 B2
(45) Date of Patent: Nov. 14, 2023

(54) METHOD FOR PLASMA MODIFICATION OF SODIUM SUPER IONIC CONDUCTOR TYPE SOLID ELECTROLYTE

(71) Applicants: KUNMING UNIVERSITY OF SCIENCE AND TECHNOLOGY, Kunming (CN); JIANGSU FENGCHI CARBON-BASED NEW MATERIALS RESEARCH INSTITUTE CO., LTD., Pizhou (CN)

(72) Inventors: Feng Liang, Kunming (CN); Minjie Hou, Kunming (CN); Da Zhang, Kunming (CN); Tao Zhang, Pizhou (CN); Sunzu Xiang, Pizhou (CN); Wenlong Jiang, Kunming (CN); Baoqiang Xu, Kunming (CN); Bin Yang, Kunming (CN)

(73) Assignees: KUNMING UNIVERSITY OF SCIENCE AND TECHNOLOGY, Kunming (CN); JIANGSU FENGCHI CARBON-BASED NEW MATERIALS RESEARCH INSTITUTE CO., LTD., Pizhou (CN)

( * ) Notice: Subject to any disclaimer, the term of this patent is extended or adjusted under 35 U.S.C. 154(b) by 51 days.

(21) Appl. No.: 17/993,893

(22) Filed: Nov. 24, 2022

(65) Prior Publication Data
US 2023/0089884 A1    Mar. 23, 2023

Related U.S. Application Data

(63) Continuation of application No. PCT/CN2022/091285, filed on May 20, 2022.

(30) Foreign Application Priority Data
Aug. 24, 2021 (CN) .......................... 202110976883.X

(51) Int. Cl.
H01M 10/0565    (2010.01)

(52) U.S. Cl.
CPC .............................. *H01M 10/0565* (2013.01); *H01M 2300/0082* (2013.01)

(58) Field of Classification Search
CPC .................. H01M 10/0565; H01M 2300/0082
See application file for complete search history.

(56) References Cited

U.S. PATENT DOCUMENTS

2014/0186719 A1*   7/2014   Wang et al. ........ H01M 4/0452
                                                                        429/316

FOREIGN PATENT DOCUMENTS

CN          111430788 A   *   7/2020
CN          111525184 A       8/2020
(Continued)

OTHER PUBLICATIONS

International Search Report issued in corresponding international application No. PCT/CN2022/091285, mailed Aug. 4, 2022.
translation of CN111430788 (Year: 2020).*
(Continued)

* cited by examiner

*Primary Examiner* — Robert C Boyle

(57) ABSTRACT

The present disclosure discloses a method for plasma modification of sodium super ionic conductor type solid electrolyte, which comprises: dielectric barrier discharge plasma modification of sodium super ionic conductor solid electrolyte particles to obtain activated sodium super ionic conductor solid electrolyte particles; weigh the polymer and the activated sodium super ionic conductor solid electrolyte particles in a predetermined proportion, dissolve the polymer and the activated sodium super ionic conductor solid electrolyte particles in an organic solvent to obtain a mixed solution, then pour the mixed solution into a preset mold, and then dry it to remove the organic solvent and form a composite solid electrolyte film. The composite solid electrolyte film is taken out of the mold and rolled to obtain the composite solid electrolyte film after rolling treatment.

8 Claims, 6 Drawing Sheets

---

Plasma modification: the solid electrolyte particles of sodium super ionic conductor are modified by dielectric barrier discharge plasma to obtain activated solid electrolyte particles of sodium super ionic conductor.

↓

Preparation of composite solid electrolyte: weighing polymer and said activated sodium super ionic conductor type solid electrolyte particles in a predetermined ratio, dissolving said polymer and said activated sodium super ionic conductor type solid electrolyte particles in an organic solvent to obtain a mixed solution, then pouring said mixed solution into a predetermined mold, then drying to remove the organic solvent and forming into a composite solid electrolyte film. The composite solid electrolyte film is taken out of the mold and rolled to obtain the composite solid electrolyte film after rolling treatment.

(56) References Cited

FOREIGN PATENT DOCUMENTS

| CN | 112331907 | A | * | 2/2021 |
|---|---|---|---|---|
| CN | 112864453 | A | * | 5/2021 |
| CN | 113078350 | A | * | 7/2021 |
| CN | 113690483 | A | | 11/2021 |
| JP | 2008021416 | A | | 1/2008 |

OTHER PUBLICATIONS translation of CN112331907 (Year: 2021).*
translation of CN112864453 (Year: 2021).*
translation of CN113078350 (Year: 2021).*
Written Opinion of the International Search Authority in corresponding International application No. PCT/CN2022/091285.

Plasma modification: the solid electrolyte particles of sodium super ionic conductor are modified by dielectric barrier discharge plasma to obtain activated solid electrolyte particles of sodium super ionic conductor.

Preparation of composite solid electrolyte: weighing polymer and said activated sodium super ionic conductor type solid electrolyte particles in a predetermined ratio, dissolving said polymer and said activated sodium super ionic conductor type solid electrolyte particles in an organic solvent to obtain a mixed solution, then pouring said mixed solution into a predetermined mold, then drying to remove the organic solvent and forming into a composite solid electrolyte film. The composite solid electrolyte film is taken out of the mold and rolled to obtain the composite solid electrolyte film after rolling treatment.

FIG. 1

Performing plasma activation treatment on sodium super ionic conductor type solid electrolyte particles to obtain activated sodium super ionic conductor type solid electrolyte particles.

A composite solid electrolyte membrane is obtained by using the activated sodium super ionic conductor type solid electrolyte particles.

FIG. 2

METHOD FOR PLASMA MODIFICATION OF SODIUM SUPER IONIC CONDUCTOR TYPE SOLID ELECTROLYTE

CROSS-REFERENCE TO RELATED APPLICATIONS

The application is a continuation of International Application No. PCT/CN2022/091285 filed on May 20, 2022, which claims priority of Chinese Patent Application 202110976883.X, filed on Aug. 24, 2021, both applications are incorporated herein by reference in their entireties.

TECHNICAL FIELD

The present disclosure relates to the field of new energy materials, in particular to a method for plasma modification of sodium super ionic conductor type solid electrolyte.

BACKGROUND

In order to solve the problems of global warming caused by fossil energy depletion and environmental pollution, it has become an inevitable trend to accelerate the optimization of energy structure and build a new power system with new energy as the main body. The development of new energy materials and energy storage devices is of great significance for promoting the green transformation of energy, coping with extreme events, ensuring energy security and promoting high-quality energy development.

Solid state sodium ion batteries are known as "green energy for the 21st century". Compared with traditional lithium batteries, solid state sodium ion batteries have the advantages of abundant raw materials, low production cost, high safety performance, wide working environment temperature range, and environmental friendliness. The large-scale application of solid-state sodium ion batteries can meet the corresponding requirements of new power systems and become one of the key supports in the energy field.

In recent years, sodium metal anode has been regarded as the key anode material for the next generation of high energy density solid sodium ion batteries due to its high mass specific capacity and low electrochemical potential. However, when sodium metal is used as the negative electrode, the growth of sodium dendrite will pierce the diaphragm and cause internal short circuit of the battery, resulting in thermal runaway, flammable and explosive problems.

In addition, solid electrolyte has the following advantages: 1) high safety, avoiding leakage and flammability problems, and reducing battery package packaging requirements; 2) Expandable electrochemical window; 3) High energy density. Therefore, the development of solid-state sodium ion battery not only has a broad application prospect, which is enough to cause revolutionary changes in energy storage devices and applications, but also plays a very important role in the national energy security strategy. According to the type of solid electrolyte used, solid sodium ion battery can be divided into inorganic solid electrolyte battery and polymer battery. At present, the development of solid-state sodium ion batteries with superior performance still faces many scientific and technological challenges.

The composite solid state electrolyte combines polymer electrolyte and inorganic solid state electrolyte, which has the unique advantages of low interfacial impedance, long cycle life, no memory function, light weight and flexibility, and easy processing, and is the key to miniaturization and portability of batteries. However, the low room temperature ionic conductivity, poor film-forming mechanical properties, high porosity, narrow electrochemical window, and poor interfacial compatibility with electrodes of such materials limit their application in solid-state sodium ion batteries. Enhancing the surface energy of inorganic solid electrolyte particles, improving their interfacial affinity with polymers, and obtaining composite solid electrolytes with uniform texture, low porosity, and high ionic conductivity are the key problems to be solved for the development of high-performance solid-state sodium ion batteries.

SUMMARY

The purpose of the present disclosure is to provide a method for plasma modification of sodium super ionic conductor type solid state electrolytes, to improve the surface energy of sodium super ionic conductor type solid state electrolyte particles, to enhance the interfacial affinity between them and polymers, to obtain a composite solid state electrolyte with low porosity, safe and reliable, low cost and low interfacial impedance, and then to optimize the cycle life and electrochemical performance of solid-state sodium ion batteries using the above composite solid state electrolytes.

In order to realize the purpose of the present disclosure, the method of plasma modifying sodium super ionic conductor type solid electrolyte provided by one embodiment of the present disclosure includes the following steps:

Plasma modification: the solid electrolyte particles of sodium super ionic conductor are modified by dielectric barrier discharge plasma to obtain activated solid electrolyte particles of sodium super ionic conductor.

Preparation of composite solid electrolyte: weighing polymer and the activated sodium super ionic conductor type solid electrolyte particles in a predetermined ratio, dissolving the polymer and the activated sodium super ionic conductor type solid electrolyte particles in an organic solvent to obtain a mixed solution, then pouring the mixed solution into a predetermined mold, then drying to remove the organic solvent and forming into a composite solid electrolyte film. The composite solid electrolyte film is taken out of the mold and rolled to obtain the composite solid electrolyte film after rolling treatment.

Compared with the prior art, in the above-mentioned method for dielectric barrier discharge plasma modification of sodium super ionic conductor type solid electrolyte particles, plasma modification treatment is used to perform plasma activation treatment on the sodium super ionic conductor type solid electrolyte particles. The surface energy of the sodium super ionic conductor type solid electrolyte particles is increased, and the affinity with the polymer is improved. Due to the enhanced Lewis acid-base interaction, the porosity of the prepared composite solid electrolyte decreases, the ionic conductivity increases, and the agglomeration of the sodium super ionic conductor solid electrolyte particles is improved. Applied to solid-state sodium-ion batteries, it can reduce the interface impedance, reduce the polarization of the battery, inhibit the growth of lithium dendrites, prolong the cycle life of the battery, and improve the electrochemical performance of the battery pack. In addition, the above-mentioned plasma-modified sodium super ionic conductor type solid electrolyte particles and composite solid electrolytes have a simple process flow, basically do not involve complex reaction processes, and reduce energy consumption and equipment investment. In addition, the present disclosure conforms to the concept of green industry and is environmentally friendly.

In some embodiments, in the step of performing plasma modification treatment on the sodium super ionic conductor type solid electrolyte particles, and the plasma activation treatment adopts a preset plasma atmosphere, a preset gas flow rate, a preset voltage, preset current and first preset time. The preset plasma atmosphere is one of nitrogen, oxygen, argon, nitrogen-oxygen mixed gas, nitrogen-argon mixed gas, and air. The pressure of the preset plasma atmosphere is atmospheric pressure. The preset voltage is the voltage applied to the sodium super ionic conductor type solid electrolyte particles, and the voltage range is 10 V to 150 V. The preset current is the current applied to the sodium super ionic conductor type solid electrolyte particles and the current range is 0.2 A to 2 A, and the first preset time is 1 min to 60 min. Specifically, the plasma activation treatment adopts the above preset plasma atmosphere, preset gas flow rate, preset voltage, preset current and preset processing time, so that the sodium super ionic conductor type solid electrolyte can have a high surface energy and excellent affinity with the polymer interface.

In some embodiments, the preset ratio is the mass ratio of the polymer to the activated sodium super ionic conductor type solid electrolyte particles, and the mass ratio ranges from 10 wt.% to 80 wt.%. Specifically, according to the above preset ratio, the porosity can be reduced, the crystallization of the polymer can be effectively suppressed, the glass transition temperature can be lowered, and better mechanical properties and ionic conductivity can be exhibited. The finally obtained composite solid electrolyte membrane has higher mechanical properties and ionic conductivity, and the battery has better cycle performance.

In some embodiments, the polymer species includes polyethylene oxide (PEO), polyvinylidene fluoride (PVDF), poly(vinylidene fluoride-co-hexafluoropropylene) (PVDF-HFP), polyethylene glycol (PEG). Specifically, the above polymers are used for their advantages such as good electrochemical stability, high dielectric constant, good thermodynamic stability, and a structure conducive to rapid ion migration. The composite solid electrolyte membrane finally obtained can have low porosity, better ionic conductivity, mechanical properties and electrochemical properties.

In some embodiments, the organic solvent includes one or both of acetone, N,N-dimethylformamide (DMF), acetonitrile, and N-methylpyrrolidone (NMP). Specifically, using the above-mentioned solvent has good compatibility with the above-mentioned polymer, and the finally obtained composite solid electrolyte membrane has better microstructure and mechanical properties.

In some embodiments, in the step of dissolving the polymer and the activated sodium super ionic conductor type solid electrolyte particles in the organic solvent to obtain a mixed solution, the polymer and the activated sodium super ionic conductor solid electrolyte particles are dissolved in the organic solvent and mechanically milled to obtain the mixed solution. Specifically, the mechanical ball milling is performed at a predetermined rotational speed of the mechanical ball milling, the predetermined rotational speed range of the mechanical ball milling may be 150 r/min~400 r/min, the time of the mechanical ball milling is the second preset time, and the second preset time range can be 5 h~48 h. Specifically, by using the mechanical ball milling of the above rotational speed and time, the polymer and the activated sodium super ionic conductor solid electrolyte particles can be dissolved in the organic solvent more uniformly and the generation of bubbles can be reduced. Further refine the grains of the sodium super ionic conductor type solid electrolyte particles. The composite solid electrolyte can be made to have smaller impedance, longer cycle performance and better electrochemical performance.

In some embodiments, the step of pouring the mixed solution into a preset mold, then drying to remove the organic solvent and forming into a composite solid electrolyte membrane comprises: the mixed solution is poured into a mold and put into a vacuum drying box, and then the temperature in the vacuum drying box is adjusted to a preset temperature and maintained for a third preset time to obtain the composite solid electrolyte membrane. The range of the third preset time is 15 h to 48 h. The preset temperature ranges from 40° C. to 100° C.

It can be understood that, in the above-mentioned method for plasma modification of sodium super ionic conductor type solid electrolyte particles, dielectric barrier discharge plasma is used to perform plasma activation treatment on the sodium super ionic conductor type solid electrolyte particles, and then cast into a film. The sodium super ionic conductor type composite solid-state electrolyte membrane increases the solid-solid interface compatibility, reduces the interface impedance, reduces the polarization of the battery, and can prolong the cycle life of the solid-state battery using the composite solid-state electrolyte membrane, and has superior performance. Specifically, by using the third predetermined time and the above-mentioned predetermined temperature range, the finally activated composite solid electrolyte membrane can also have better microstructure and mechanical properties.

In some embodiments, the thickness of the composite solid electrolyte film after rolling treatment is 30 μm~100 μm, which can make the performance of the activated composite solid electrolyte film better, such as good sodium ion transport performance and battery cycle performance.

In addition, the above-mentioned plasma-modified sodium super ionic conductor type solid electrolyte particles and composite solid electrolytes have a simple process flow, basically do not involve complex reaction processes, and reduce energy consumption and equipment investment. In addition, the present disclosure conforms to the concept of green industry and is environmentally friendly.

BRIEF DESCRIPTION OF THE DRAWINGS

In order to illustrate the technical solutions in the embodiments of the present application more clearly, the accompanying drawings required in the embodiments will be briefly introduced below. Obviously, the drawings in the following description are only some embodiments of the present application, and for those of ordinary skill, other drawings can also be obtained from these drawings without creative effort.

FIG. 1 is a kind of method step schematic diagram of plasma-modified sodium super ionic conductor type solid electrolyte particle provided by the present disclosure;

FIG. 2 is a schematic diagram of the method steps of another plasma-modified sodium super ionic conductor type solid electrolyte particle provided by the present disclosure;

DETAILED DESCRIPTION OF THE EMBODIMENTS

Figure 3:
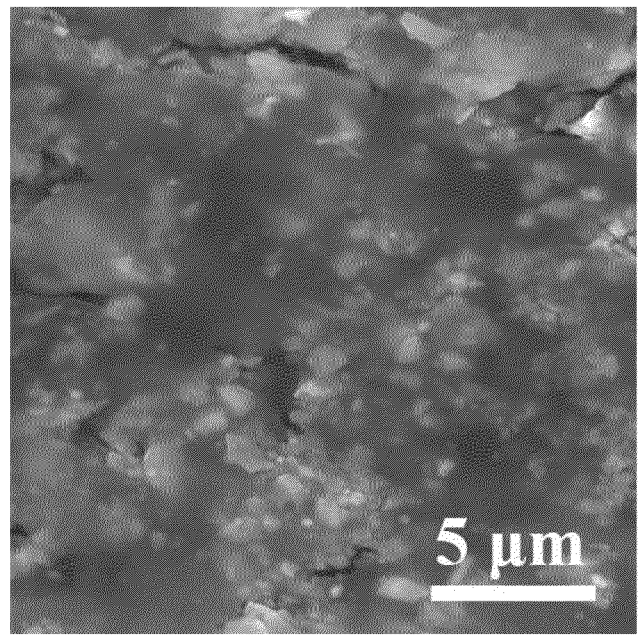
FIG. 3 is a scanning electron microscope (SEM) image of the composite solid electrolyte prepared by the unmodified sodium super ionic conductor solid electrolyte particles obtained by the first implementation of the present disclosure.

The present disclosure will be further described in detail below with reference to the accompanying drawings and specific embodiments, but the protection scope of the present disclosure is not limited to the content.

As mentioned above, the current development of solid-state sodium-ion batteries with superior performance still faces many scientific and technical challenges: large interfacial (electrode/solid electrolyte) resistance, volume change of electrode materials, low loading of electrode active materials, and poor cycling stability. Among the many challenges, an important one that needs to be solved urgently is to increase the solid electrolyte density, reduce the porosity, and suppress the uneven deposition of lithium metal at the pores. The key to overcoming this challenge is whether the surface modification of inorganic solid electrolyte particles can be carried out to improve the interfacial affinity between inorganic solid electrolyte and organic matter, and to enhance the Lewis acid-base effect.

The molecular formula of the sodium super ionic conductor type solid electrolyte particles involved in the embodiments of the present disclosure is $Na_xZr_2Si_{x-1}P_{4-x}O_{12}$, where $1 \leq x \leq 4$. The embodiment of the present disclosure utilizes plasma modification to effectively increase the surface energy of the sodium super ionic conductor type solid electrolyte particles, and improves the interface affinity and Lewis acid-base effect between the sodium super ionic conductor type solid electrolyte particles and the polymer. The porosity of the prepared composite solid electrolyte membrane is reduced, and the sodium super ionic conductor type solid electrolyte particles are evenly distributed, which promotes the uniform deposition of lithium metal and improves the stability and cycle life of the solid sodium ion battery.

Specifically, as shown in FIG. 1, the method for plasma modification of sodium super ionic conductor type solid electrolyte particles provided by the present disclosure comprises the following steps:

Plasma modification: the solid electrolyte particles of sodium super ionic conductor are modified by dielectric barrier discharge plasma to obtain activated solid electrolyte particles of sodium super ionic conductor.

Preparation of composite solid electrolyte: weighing polymer and the activated sodium super ionic conductor type solid electrolyte particles in a predetermined ratio, dissolving the polymer and the activated sodium super ionic conductor type solid electrolyte particles in an organic solvent to obtain a mixed solution, then pouring the mixed solution into a predetermined mold, then drying to remove the organic solvent and forming into a composite solid electrolyte film. The composite solid electrolyte film is taken out of the mold and rolled to obtain the composite solid electrolyte film after rolling treatment.

Compared with the prior art, in the above-mentioned method for dielectric barrier discharge plasma modification of sodium super ionic conductor type solid electrolyte particles, plasma modification treatment is used to perform plasma activation treatment on the sodium super ionic conductor type solid electrolyte particles. The surface energy of the sodium super ionic conductor type solid electrolyte particles is increased, and the affinity with the polymer is improved. Due to the enhanced Lewis acid-base interaction, the porosity of the prepared composite solid electrolyte decreases, the ionic conductivity increases, and the agglomeration of the sodium super ionic conductor solid electrolyte particles is improved. Applied to solid-state sodium-ion batteries, it can reduce the interface impedance, reduce the polarization of the battery, inhibit the growth of lithium dendrites, prolong the cycle life of the battery, and improve the electrochemical performance of the battery pack. In addition, the above-mentioned plasma-modified sodium super ionic conductor type solid electrolyte particles and composite solid electrolytes have a simple process flow, basically do not involve complex reaction processes, and reduce energy consumption and equipment investment. In addition, the present disclosure conforms to the concept of green industry and is environmentally friendly.

In some embodiments, in the step of performing plasma modification treatment on the sodium super ionic conductor type solid electrolyte particles, and the plasma activation treatment adopts a preset plasma atmosphere, a preset gas flow rate, a preset voltage, preset current and first preset time. The preset plasma atmosphere is one of nitrogen, oxygen, argon, nitrogen-oxygen mixed gas, nitrogen-argon mixed gas, and air. The pressure of the preset plasma atmosphere is atmospheric pressure. The preset voltage is the voltage applied to the sodium super ionic conductor type solid electrolyte particles, and the voltage range is 10 V to 150 V. The preset current is the current applied to the sodium super ionic conductor type solid electrolyte particles and the current range is 0.2 A to 2 A, and the first preset time is 1 min to 60 min. Specifically, the plasma activation treatment adopts the above preset plasma atmosphere, preset gas flow rate, preset voltage, preset current and preset processing time, so that the sodium super ionic conductor type solid electrolyte can have a high surface energy and excellent affinity with the polymer interface.

In some embodiments, the preset ratio is the mass ratio of the polymer to the activated sodium super ionic conductor type solid electrolyte particles, and the mass ratio ranges from 10 wt.% to 80 wt.%. Specifically, according to the above preset ratio, the porosity can be reduced, the crystallization of the polymer can be effectively suppressed, the glass transition temperature can be lowered, and better mechanical properties and ionic conductivity can be exhibited. The finally obtained composite solid electrolyte membrane has higher mechanical properties and ionic conductivity, and the battery has better cycle performance.

In some embodiments, the polymer species includes polyethylene oxide (PEO), polyvinylidene fluoride (PVDF), poly(vinylidene fluoride-co-hexafluoropropylene) (PVDF-HFP), polyethylene glycol (PEG). Specifically, the above polymers are used for their advantages such as good electrochemical stability, high dielectric constant, good thermodynamic stability, and a structure conducive to rapid ion migration. The composite solid electrolyte membrane finally obtained can have low porosity, better ionic conductivity, mechanical properties and electrochemical properties.

In some embodiments, the organic solvent includes one or both of acetone, N,N-dimethylformamide (DMF), acetonitrile, and N-methylpyrrolidone (NMP). Specifically, using the above-mentioned solvent has good compatibility with the above-mentioned polymer, and the finally obtained composite solid electrolyte membrane has better microstructure and mechanical properties.

In some embodiments, in the step of dissolving the polymer and the activated sodium super ionic conductor type solid electrolyte particles in the organic solvent to obtain a mixed solution, the polymer and the activated sodium super ionic conductor solid electrolyte particles are dissolved in the organic solvent and mechanically milled to obtain the mixed solution. Specifically, the mechanical ball milling is performed at a predetermined rotational speed of the mechanical ball milling, the predetermined rotational speed range of the mechanical ball milling may be 150 r/min~400 r/min, the time of the mechanical ball milling is the second preset time, and the second preset time range can be 5 h~48 h. Specifically, by using the mechanical ball milling of the above rotational speed and time, the polymer and the activated sodium super ionic conductor solid electrolyte particles can be dissolved in the organic solvent more uniformly and the generation of bubbles can be reduced. Further refine the grains of the sodium super ionic conductor type solid electrolyte particles. The composite solid electrolyte can be made to have smaller impedance, longer cycle performance and better electrochemical performance.

In some embodiments, the step of pouring the mixed solution into a preset mold, then drying to remove the organic solvent and forming into a composite solid electrolyte membrane comprises: the mixed solution is poured into a mold and put into a vacuum drying box, and then the temperature in the vacuum drying box is adjusted to a preset temperature and maintained for a third preset time to obtain the composite solid electrolyte membrane. The range of the third preset time is 15 h to 48 h. The preset temperature ranges from 40° C. to 100° C.

It can be understood that, in the above-mentioned method for plasma modification of sodium super ionic conductor type solid electrolyte particles, dielectric barrier discharge plasma is used to perform plasma activation treatment on the sodium super ionic conductor type solid electrolyte particles, and then cast into a film. The sodium super ionic conductor type composite solid-state electrolyte membrane increases the solid-solid interface compatibility, reduces the interface impedance, reduces the polarization of the battery, and can prolong the cycle life of the solid-state battery using the composite solid-state electrolyte membrane, and has superior performance. Specifically, by using the third predetermined time and the above-mentioned predetermined temperature range, the finally activated composite solid electrolyte membrane can also have better microstructure and mechanical properties.

Further, a kind of method for dielectric barrier discharge plasma modified sodium super ionic conductor type solid electrolyte provided by the present disclosure can also be briefly summarized as follows:

Performing plasma activation treatment on sodium super ionic conductor type solid electrolyte particles to obtain activated sodium super ionic conductor type solid electrolyte particles.

A composite solid electrolyte membrane is obtained by using the activated sodium super ionic conductor type solid electrolyte particles.

Among them, it can be understood that the step of performing plasma activation treatment on the sodium super ionic conductor type solid electrolyte particles to obtain activated sodium super ionic conductor type solid electrolyte particles may include the specific steps of using the plasma modification treatment shown in FIG. 1.

In some embodiments, the thickness of the composite solid electrolyte film after rolling treatment is 30 μm~100 μm, which can make the performance of the activated composite solid electrolyte film better, such as good sodium ion transport performance and battery cycle performance.

In addition, the above-mentioned plasma-modified sodium super ionic conductor type solid electrolyte particles and composite solid electrolytes have a simple process flow, basically do not involve complex reaction processes, and reduce energy consumption and equipment investment. In addition, the present disclosure conforms to the concept of green industry and is environmentally friendly. The step of using the activated sodium super ionic conductor type solid electrolyte particles to obtain the composite solid electrolyte membrane may include the above-mentioned preparation steps of the composite solid electrolyte shown in FIG. 1, which will not be further described here.

The present disclosure will be described in detail below with reference to the first to eighth embodiments.

First Embodiment (1) Plasma modification: the sodium super ionic conductor solid electrolyte particles were activated by dielectric barrier plasma for 5 min under nitrogen gas flow rate of 10 m/s, operating current of 1 A, and voltage of 100 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 1:4, and dissolve them in acetone and N,N-dimethylformamide, and the passing speed is 250 r/min mechanical ball milling for 24 h to obtain a mixed solution. Then, the above mixed solution was slowly poured into a polytetrafluoroethylene mold, and then rolled to a thickness of 20 μm, placed in a vacuum drying box at a temperature of 80° C. for 24 h to remove the above organic solvent, and a composite solid electrolyte membrane was obtained.

Figure 4:
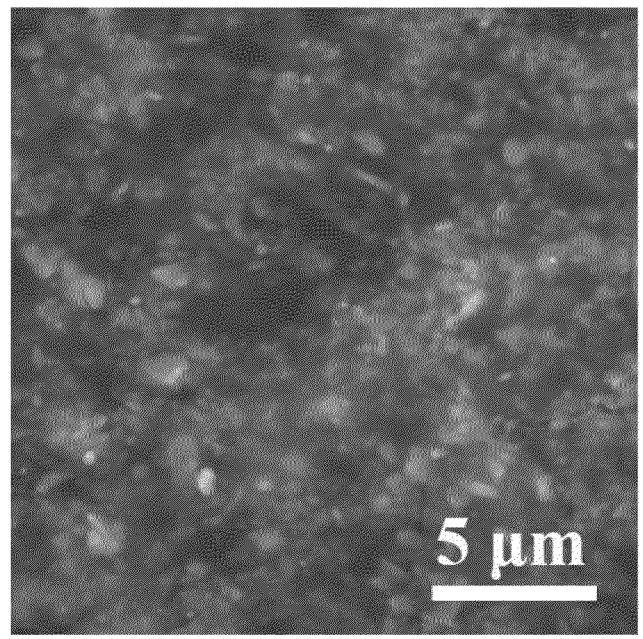
FIG. 4 is a scanning electron microscope (SEM) image of the composite solid electrolyte prepared by the plasma-modified sodium super ionic conductor type solid electrolyte particles obtained by the first implementation of the present disclosure.
Figure 5:
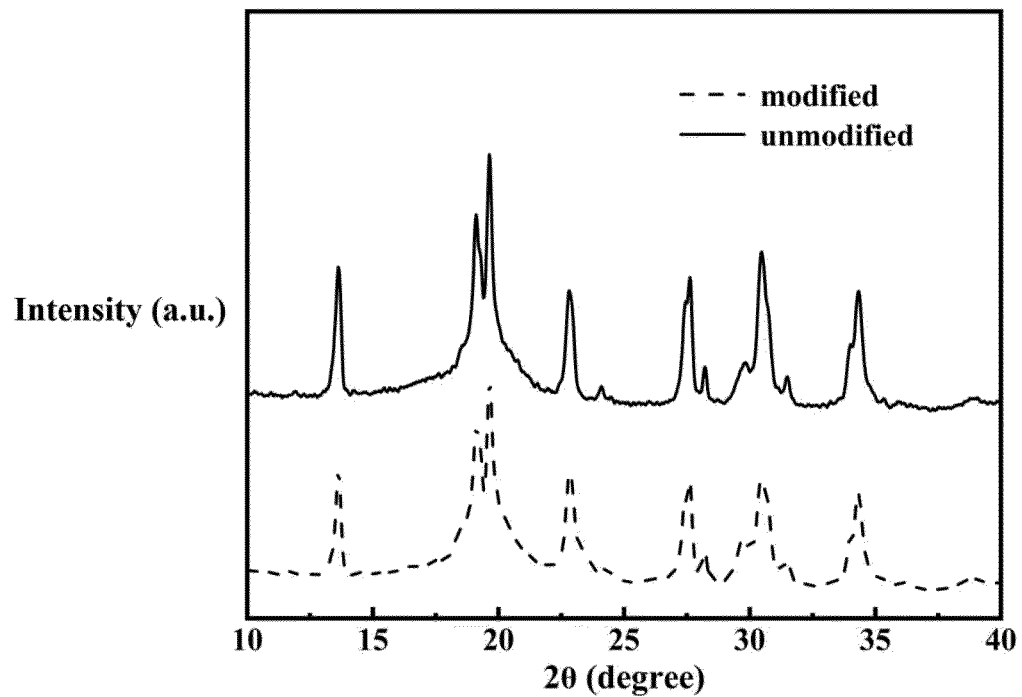
FIG. 5 is an X-ray diffraction (XRD) pattern of the plasma-modified/unmodified sodium super ionic conductor solid electrolyte particles obtained by the first implementation of the present disclosure.
Figure 6:
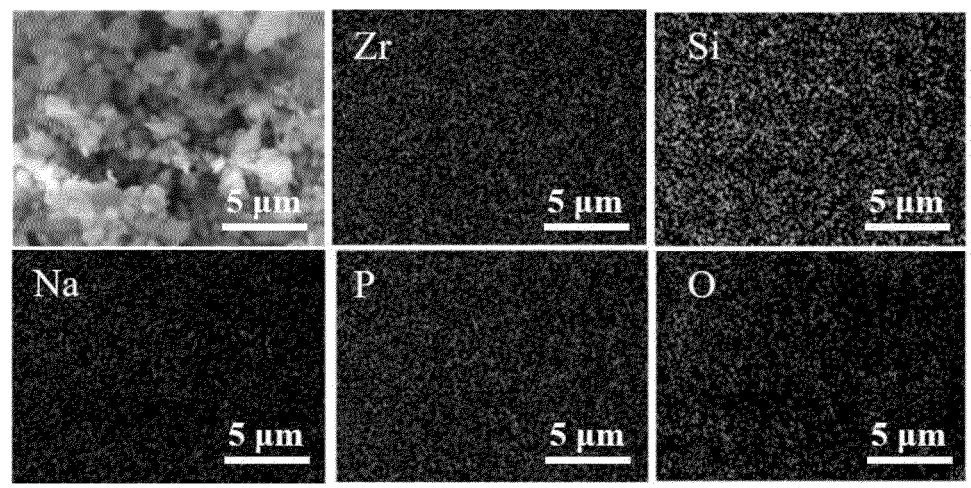
FIG. 6 is the energy spectrum analysis (EDS) of the composite solid electrolyte prepared by the unmodified sodium super ionic conductor solid electrolyte particles obtained by the first implementation of the present disclosure.
Figure 7:
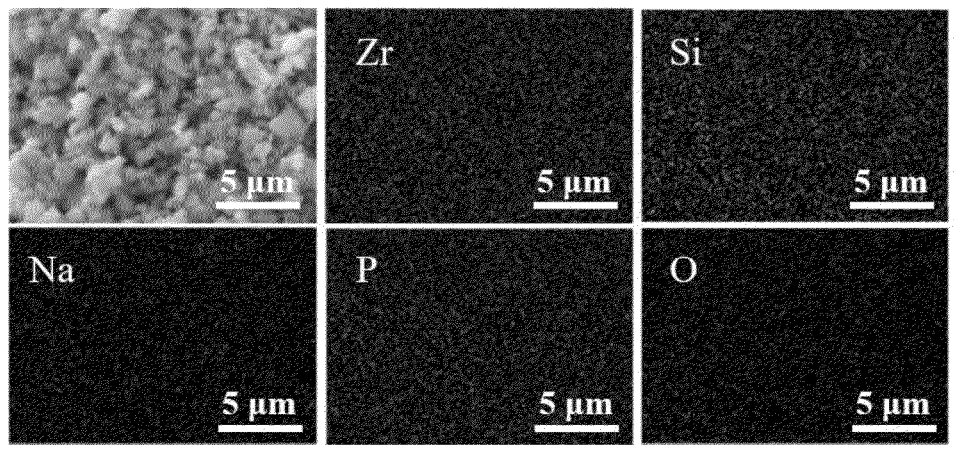
FIG. 7 is the energy spectrum analysis (EDS) of the composite solid electrolyte prepared by the plasma-modified sodium super ionic conductor solid electrolyte particles obtained by the first implementation of the present disclosure.
Figure 8:
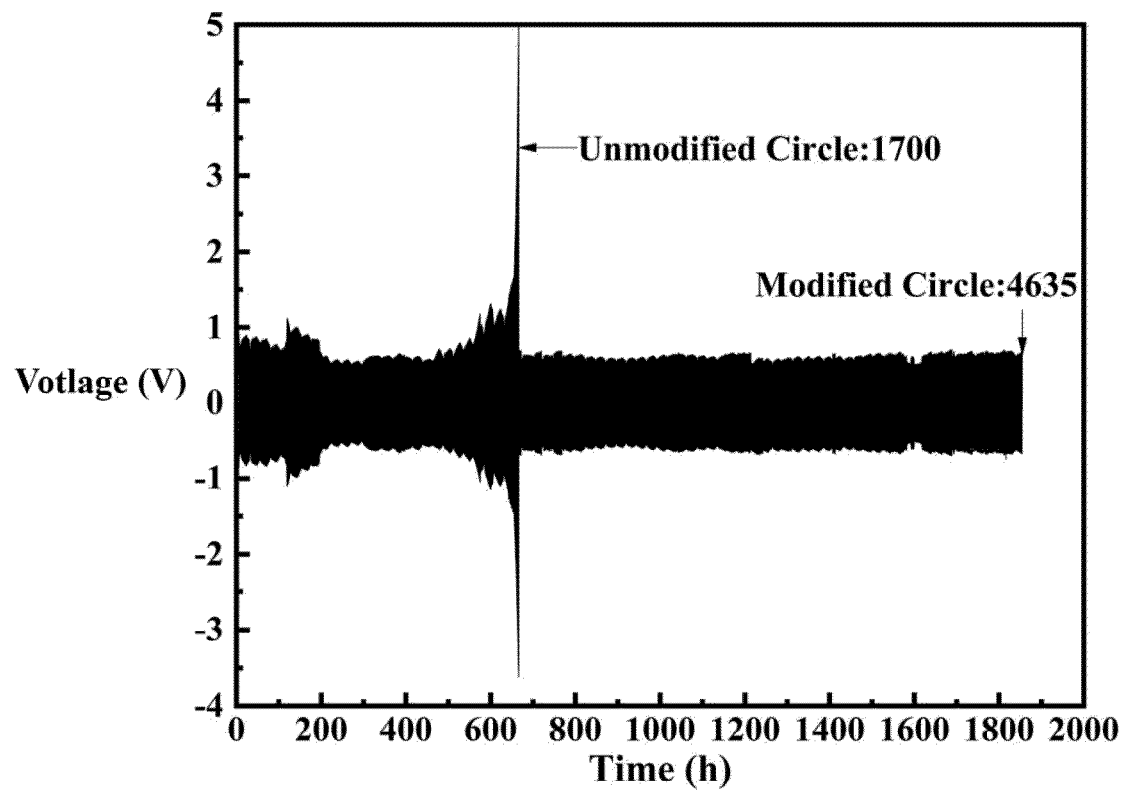
FIG. 8 is a cycle comparison diagram of a symmetric battery (Na/composite solid electrolyte/Na) based on the plasma modified/unmodified sodium super ionic conductor composite solid electrolyte obtained by the first implementation of the present disclosure.
Figure 9:
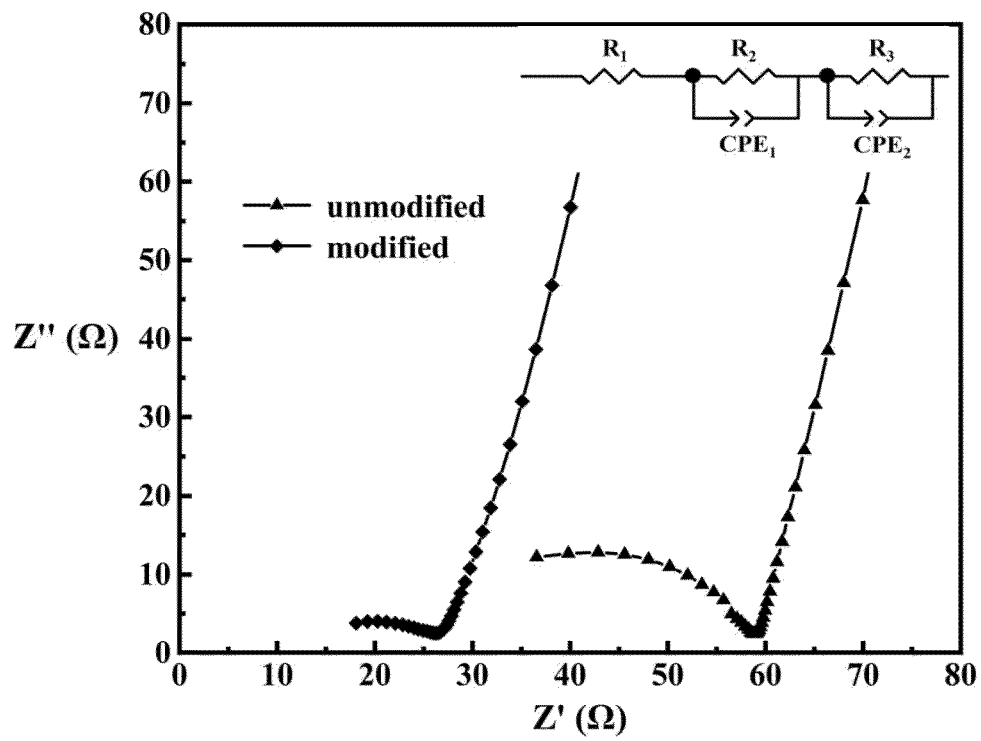
FIG. 9 is the electrochemical impedance spectroscopy (EIS) comparison diagram of the plasma-modified/unmodified-treated sodium super ionic conductor composite solid electrolyte obtained by the first implementation of the present disclosure.

In this example, physical and electrochemical tests are carried out on the sodium super ionic conductor type composite solid electrolyte obtained by plasma activation. Comparing the scanning electron microscopes in FIG. 3 and FIG. 4, it can be concluded that the surface cracks and porosity of the composite solid electrolyte after the dielectric barrier discharge plasma activation treatment are reduced compared with the untreated. It can be seen from FIG. 5 that the position and intensity of the diffraction peaks before and after the treatment do not change significantly, which confirms that the plasma activation treatment does not change the crystal structure of the sodium super ionic conductor. Comparing FIG. 6 and FIG. 7, it can be seen that after the dielectric barrier discharge plasma activation treatment, the particle size and element distribution are more uniform, and the agglomeration is significantly reduced. It can be seen from FIG. 8 and FIG. 9 that, compared with untreated, the polarization of the battery is reduced from 0.85 V to 0.55 V, the battery can be stably cycled for more than 1800 h, and the interface impedance is reduced from 58 Ω to 24 Ω.

Second Embodiment (1) Plasma modification: the sodium super ionic conductor solid electrolyte particles were activated by dielectric barrier plasma for 1 min under nitrogen gas flow rate of 10 m/s, operating current of 2 A, and voltage of 150 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 4:1, and dissolve them in acetone and N,N-dimethylformamide, and the passing speed is 400 r/min mechanical ball milling for 5 h to obtain a mixed solution. Then, the above mixed solution was slowly poured into a polytetrafluoroethylene mold, and then rolled to a thickness of 100 μm, placed in a vacuum drying box at a temperature of 80° C. for 15 h to remove the above organic solvent, and a composite solid electrolyte membrane was obtained.

Figure 10:
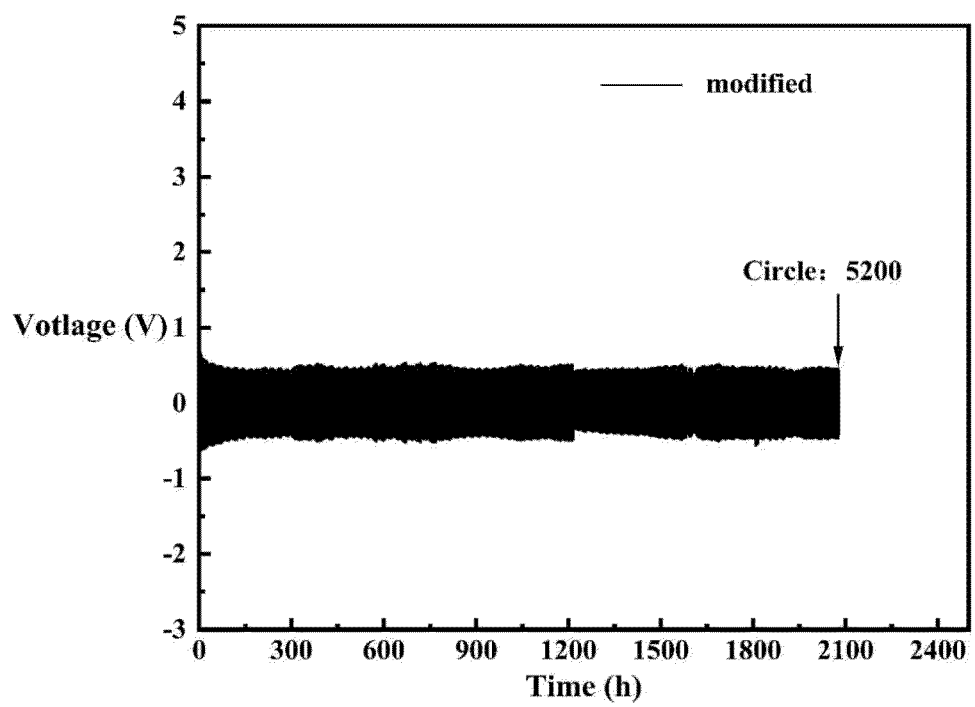
FIG. 10 is a cycle diagram of a symmetrical battery (Na/composite solid electrolyte/Na) of a plasma-modified sodium super ionic conductor composite solid electrolyte obtained by the second implementation of the present disclosure.

In this example, as shown in FIG. 10, the symmetric battery (Na | composite solid electrolyte | Na) assembled based on the composite solid electrolyte with an activated sodium super ionic conductor type solid electrolyte particle content of 80 wt.% can be stably cycled for more than 2100 h, and has Stable polarization voltage of 0.5 V.

Third Embodiment (1) Plasma modification: the sodium super ionic conductor solid electrolyte particles were activated by dielectric barrier plasma for 60 min under nitrogen gas flow rate of 10 m/s, operating current of 0.2 A, and voltage of 10 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 1:9, and dissolve them in acetone and N,N-dimethylformamide, and the passing speed is 150 r/min mechanical ball milling for 48 h to obtain a mixed solution. Then, the above mixed solution was slowly poured into a polytetrafluoroethylene mold, and then rolled to a thickness of 30 μm, placed in a vacuum drying box at a temperature of 40° C. for 48 h to remove the above organic solvent, and a composite solid electrolyte membrane was obtained.

Figure 11:
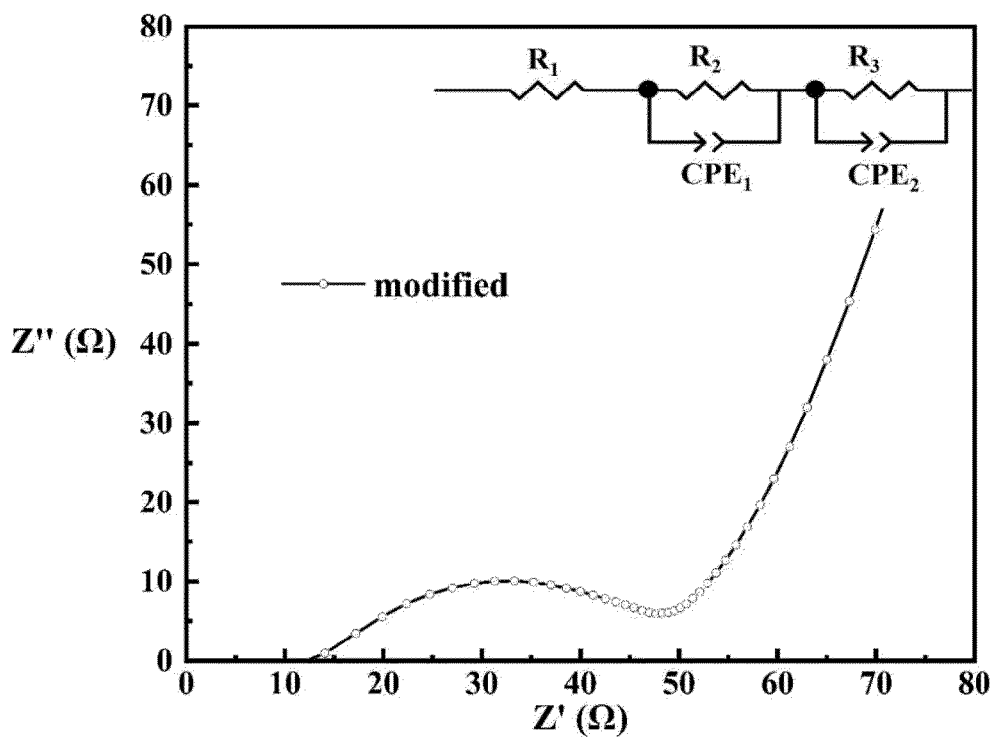
FIG. 11 is the electrochemical impedance spectroscopy (EIS) of the plasma-modified sodium super ionic conductor composite solid electrolyte obtained by the third implementation of the present disclosure.

In this example, an AC impedance test was performed on the composite solid electrolyte, as shown in FIG. 11. Compared with the unmodified composite solid electrolyte, the composite solid electrolyte prepared based on the activated sodium super ionic conductor-type solid electrolyte particles has an obvious impedance reduction advantage, and the interface impedance is reduced from 58 Ω to 47 Ω.

Fourth Embodiment (1) Plasma modification: the sodium super ionic conductor solid electrolyte particles were activated by dielectric barrier plasma for 5 min under nitrogen gas flow rate of 10 m/s, operating current of 1.5 A, and voltage of 130 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 1:4, and dissolve them in acetone and N,N-dimethylformamide, and the passing speed is 250 r/min mechanical ball milling for 24 h to obtain a mixed solution. Then, the above mixed solution was slowly poured into a polytetrafluoroethylene mold, and then rolled to a thickness of 40 μm, placed in a vacuum drying box at a temperature of 40° C. for 48 h to remove the above organic solvent, and a composite solid electrolyte membrane was obtained.

The composite solid electrolyte was electrochemically tested in this example, and has relatively lower impedance and polarization, and longer cycle life compared to untreated.

Fifth Embodiment (1) Plasma modification: the sodium super ionic conductor solid electrolyte particles were activated by dielectric barrier plasma for 10 min under nitrogen gas flow rate of 10 m/s, operating current of 1.5 A, and voltage of 130 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 1:1, and dissolve them in acetone and N,N-dimethylformamide, and the passing speed is 350 r/min mechanical ball milling for 10 h to obtain a mixed solution. Then, the above mixed solution was slowly poured into a polytetrafluoroethylene mold, and then rolled to a thickness of 50 μm, placed in a vacuum drying box at a temperature of 40° C. for 36 h to remove the above organic solvent, and a composite solid electrolyte membrane was obtained.

The composite solid electrolyte was electrochemically tested in this example, and has relatively lower impedance and polarization, and longer cycle life compared to untreated.

Sixth Embodiment (1) Plasma modification: the sodium super ionic conductor solid electrolyte particles were activated by dielectric barrier plasma for 40 min under nitrogen gas flow rate of 10 m/s, operating current of 0.8 A, and voltage of 60 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 1:2, and dissolve them in acetone and N,N-dimethylformamide, and the passing speed is 300 r/min mechanical ball milling for 30 h to obtain a mixed solution. Then, the above mixed solution was slowly poured into a polytetrafluoroethylene mold, and then rolled to a thickness of 60 μm, placed in a vacuum drying box at a temperature of 60° C. for 36 h to remove the above organic solvent, and a composite solid electrolyte membrane was obtained.

The composite solid electrolyte was electrochemically tested in this example, and has relatively lower impedance and polarization, and longer cycle life compared to untreated.

Seventh Embodiment (1) Plasma modification: the sodium super ionic conductor solid electrolyte particles were activated by dielectric barrier plasma for 50 min under nitrogen gas flow rate of 10 m/s, operating current of 1.2 A, and voltage of 80 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 1:1, and dissolve them in acetone and N,N-dimethylformamide, and the passing speed is 400 r/min mechanical ball milling for 30 h to obtain a mixed solution. Then, the above mixed solution was slowly poured into a polytetrafluoroethylene mold, and then rolled to a thickness of 60 μm, placed in a vacuum drying box at a temperature of 60° C. for 36 h to remove the above organic solvent, and a composite solid electrolyte membrane was obtained.

The composite solid electrolyte was electrochemically tested in this example, and has relatively lower impedance and polarization, and longer cycle life compared to untreated.

Eighth Embodiment (1) Plasma modification: the sodium super ionic conductor solid electrolyte particles were activated by dielectric barrier plasma for 60 min under nitrogen gas flow rate of 10 m/s, operating current of 0.5 A, and voltage of 40 V. The activated sodium super ionic conductor type solid electrolyte particles were then cooled to room temperature.

(2) Preparation of composite solid electrolyte: weigh PVDF-HFP and the activated sodium super ionic conductor type solid electrolyte particles obtained in step (1) according to the mass ratio of 1:1, and dissolve them in acetone and N,N-dimethylformamide, and the passing speed is 400 r/min mechanical ball milling for 30 h to obtain a mixed solution. Then, the above mixed solution was slowly poured into a polytetrafluoroethylene mold, and then rolled to a thickness of 60 μm, placed in a vacuum drying box at a temperature of 80° C. for 24 h to remove the above organic solvent, and a composite solid electrolyte membrane was obtained.

The composite solid electrolyte was electrochemically tested in this example, and has relatively lower impedance and polarization, and longer cycle life compared to untreated.

The above embodiments are preferred embodiments of the present disclosure, but the embodiments of the present disclosure are not limited by the above embodiments, and any other changes, modifications, substitutions, combinations and simplifications that depart from the spirit and principles of the present disclosure shall be equivalent substitutions and are included in the scope of protection of the present disclosure.

What is claimed is:

1. A method for plasma modification of sodium super ionic conductor type solid electrolyte, wherein the method comprises following steps:
    plasma modification, the plasma modification comprising a solid electrolyte particles of sodium super ionic conductor being modified by dielectric barrier discharge plasma to obtain an activated sodium super ionic conductor type solid electrolyte particles; and
    preparation of composite solid electrolyte, the preparation of composite solid electrolyte comprising: a step of weighing polymer and the activated sodium super ionic conductor type solid electrolyte particles in a predetermined ratio, a step of dissolving the polymer and the activated sodium super ionic conductor type solid electrolyte particles in an organic solvent to obtain a mixed solution, a step of pouring the mixed solution into a predetermined mold, a step of drying to remove the organic solvent and forming into a composite solid electrolyte film; and a step of taking the composite solid electrolyte film out of the predetermined mold and rolled to obtain a roll-treated composite solid electrolyte film.

2. The method according to claim 1, wherein, the plasma modification adopts a preset plasma atmosphere, a preset gas flow rate, a preset voltage, a preset current, and a first preset time, the preset plasma atmosphere is one or more of nitrogen, oxygen, argon, nitrogen oxygen mixture, nitrogen argon mixture, and air, a pressure of the preset plasma atmosphere is atmospheric pressure, the preset voltage is applied to the sodium super ionic conductor solid electrolyte particles, the preset voltage ranges from 10 V to 150 V, the preset current is applied to the sodium super ionic conductor solid electrolyte particles, the preset current ranges from 0.2 A to 2 A, and the first preset time ranges from 1 min to 60 mins.

3. The method according to claim 1, wherein the polymer comprises at least one of polyethylene oxide, polyvinylidene fluoride, polyvinylidene difluoride-co-hexafluoropropylene, and polyethylene glycol.

4. The method according to claim 1, wherein the organic solvent comprises one or both of acetone, N,N-dimethylformamide, acetonitrile, and N-methylpyrrolidone.

5. The method according to claim 1, wherein the step of dissolving the polymer with the activated sodium super ionic conductor type solid electrolyte particles in the organic solvent to obtain a mixed solution comprises dissolving the polymer with the activated sodium super ionic conductor type solid electrolyte particles in an organic solvent and performing mechanical ball milling to obtain the mixed solution.

6. The method according to claim 5, wherein the mechanical ball milling is carried out at a predetermined mechanical ball milling speed, and the predetermined mechanical ball milling speed ranges from 150 r/min to 400 r/min; a time of the mechanical ball milling is a second preset time, and the range of the second preset time is 5 h~48 h.

7. The method according to claim 1, wherein the steps of pouring the mixed solution into a mold, drying to remove the organic solvent and forming a composite solid electrolyte film comprises: pouring the mixed solution into the mold, putting it into a vacuum drying oven, and then adjusting the temperature in the vacuum drying oven to a preset temperature and maintaining it for a third preset time to obtain the composite solid electrolyte film; the range of the third preset time is 15 h to 48 h; the preset temperature ranges from 40° C. to 100° C.

8. The method according to claim 1, wherein the thickness of the roll-treated composite solid electrolyte film ranges from 30 μm to 100 μm.

* * * * *